(12) United States Patent
Liu et al.

(10) Patent No.: US 6,535,940 B1
(45) Date of Patent: Mar. 18, 2003

(54) SYSTEM AND METHOD FOR FAST DATA TRANSFERS IN AN ELECTRONIC NETWORK

(75) Inventors: Jung-Jen Liu, San Jose, CA (US); Scott Smyers, San Jose, CA (US); Bruce A. Fairman, Woodside, CA (US); Steve Pham, Milpitas, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/363,086

(22) Filed: Jul. 28, 1999

(51) Int. Cl.[7] ............................................. G06F 13/372
(52) U.S. Cl. ........................ 710/129; 370/413; 709/250
(58) Field of Search ..................... 709/250; 710/129; 370/413

(56) References Cited

U.S. PATENT DOCUMENTS 5,537,646 A * 7/1996 Buck et al.
5,857,114 A * 1/1999 Kim
5,991,304 A * 11/1999 Abramson .................. 370/413
6,098,121 A * 8/2000 Furuya
6,275,886 B1 * 8/2001 Levy ........................... 710/129

OTHER PUBLICATIONS

Rosch, Hardware Bible, pp. 375–377, 1994.*
Mano, Computer System Architecture, pp. 428–434, 1982.*

* cited by examiner

*Primary Examiner*—John A. Follansbee
*Assistant Examiner*—Kenneth Tang
(74) *Attorney, Agent, or Firm*—Gregory J. Koerner; Simon & Koerner LLP

(57) ABSTRACT

A system and method for fast data transfers in an electronic network comprises a data transfer engine configured to independently execute data transfer instructions and a processor configured to forward the data transfer instructions to the data transfer engine. The data transfer engine preferably executes the data transfer instructions while the processor proceeds to execute a next instruction. The data transfer engine includes a transmit engine that executes transmit transfer instructions and a receive engine that executes receive transfer instructions. The transmit engine and the receive engine operate independently and thus may operate concurrently.

36 Claims, 9 Drawing Sheets

SYSTEM AND METHOD FOR FAST DATA TRANSFERS IN AN ELECTRONIC NETWORK

CROSS-REFERENCE TO RELATED APPLICATIONS

This application is related to co-pending U.S. application Ser. No. 09/322,632, entitled "System And Method For Context Switching In An Electronic Network," filed on May 28, 1999, and to co-pending U.S. application Ser. No. 09/336,064, entitled "System And Method For Multi-Level Context Switching In An Electronic Network," filed on Jun. 18, 1999, which are hereby incorporated by reference. The related applications are commonly assigned.

BACKGROUND OF THE INVENTION

1. Field of the Invention

This invention relates generally to electronic networks, and relates more particularly to a system and method for fast data transfers in an electronic network.

2. Description of the Background Art

Implementing an effective method for managing communications between electronic devices within an electronic network is a significant consideration of designers, manufacturers, and users of electronic devices. An electronic device in an electronic network may advantageously communicate with other electronic devices in the network to share data and substantially increase the resources available to individual devices in the network. For example, an electronic network may be implemented in a user's home to enable flexible and beneficial sharing of resources between various consumer electronic devices, such as personal computers, digital video disc (DVD) devices, digital set-top boxes for digital broadcasting, television sets, and audio playback systems.

In some types of electronic networks, electronic devices may be "daisy-chained," so that devices are directly connected to one another in a tree-like structure instead of being connected to a common network bus structure. In such a network, data being delivered via the bus may pass through various intermediate devices before arriving at the destination device. Each device in the chain preferably processes data without undue delay so that data transfers across the network are as efficient as possible.

One type of data transfer that may occur in an electronic network is an isochronous data transfer. Isochronous data transfers are typically used for time-sensitive applications. Video or audio data being transmitted across a network needs to arrive at a display device in an uninterrupted flow with appropriate timing. Isochronous data transfers allow data to be delivered as fast as it is displayed to facilitate the synchronization of audio and video data. For example, an analog voice signal may be digitized at a rate of one byte every 125 microseconds. It is advantageous to deliver this voice data at a rate of one byte every 125 microseconds for the display device to correctly reconstruct the analog voice signal.

Since timing is significant for effective isochronous data transfers, processing isochronous data should be as efficient as possible for timely delivery of the isochronous data. Therefore, managing communications between electronic devices in an electronic network remains a significant consideration for designers, manufacturers, and users of electronic devices.

SUMMARY OF THE INVENTION

In accordance with the present invention, a system and method are disclosed for implementing fast data transfers in an electronic network. In one embodiment, the invention includes a data transfer engine configured to independently execute data transfer instructions, and a processor configured to forward the data transfer instructions to the data transfer engine. The data transfer engine preferably executes the data transfer instructions while the processor proceeds to execute a next instruction. The data transfer instructions include move-multiple instructions for moving words of data from one device to another. The data transfer instructions include transmit transfer instructions and receive transfer instructions, which may be differentiated by the designation of a source register and a destination register in the move-multiple instructions.

The data transfer engine includes a transmit engine that executes the transmit transfer instructions, and a receive engine that executes the receive transfer instructions. The transmit engine and the receive engine operate independently and thus may operate concurrently, while the processor advantageously may execute next instructions. The transmit engine and the receive engine preferably execute the move-multiple instructions so that there are no delays between adjacent words of data. In other words, the data is preferably delivered to a destination device at a rate of one word per clock cycle.

The data transfer engine also preferably includes an instruction decoder that receives the data transfer instructions from the processor. The instruction decoder sends the transmit transfer instructions to the transmit engine, and sends the receive transfer instructions to the receive engine. The data transfer engine also preferably includes an operation arbiter configured to control independent operations of the transmit engine and the receive engine. The present invention thus efficiently and effectively implements a system and method for fast data transfers in an electronic network.

DETAILED DESCRIPTION OF THE PREFERRED EMBODIMENT

The present invention relates to an improvement in electronic networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention includes a data transfer engine configured to independently execute data transfer instructions, and a processor configured to forward the data transfer instructions to the data transfer engine. The data transfer engine preferably executes the data transfer instructions while the processor proceeds to execute a next instruction. The data transfer engine includes a transmit engine that executes transmit transfer instructions, and a receive engine that executes receive transfer instructions. The transmit engine and the receive engine operate independently and thus may operate concurrently.

Figure 1:
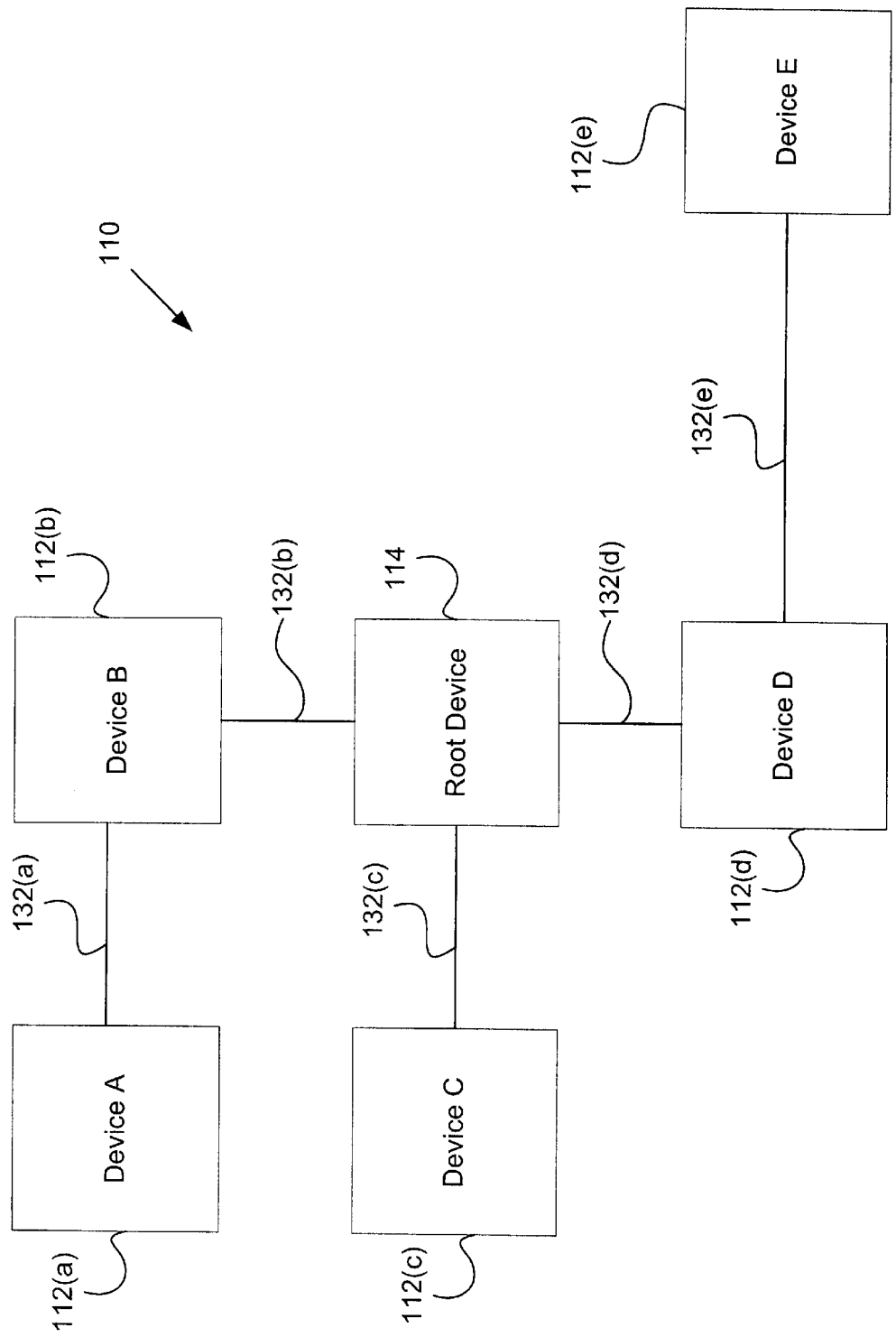
FIG. 1 is a block diagram for one embodiment of an electronic network, according to the present invention.

Referring now to FIG. 1, a block diagram for one embodiment of an electronic network 110 is shown, according to the present invention. The electronic network includes, but is not limited to, a device A 112(a), a device B 112(b), a root device 114, a device C 112(c), a device D 112(d), and a device E 112(e). Various other embodiments of electronic network 110 may contain a greater or lesser number of devices, which may be connected in numerous different configurations. Device A 112(a), device B 112(b), root device 114, device C 112(c), device D 112(d), and device E 112(e) may be implemented as any type of electronic device, including, but not limited to, personal computers, printers, digital video disc devices, television sets, audio systems, video cassette recorders, and set-top boxes for digital broadcasting.

The devices in electronic network 110 preferably communicate with one another using a bus. The bus includes cable 132(a), cable 132(b), cable 132(c), cable 132(d), and cable 132(e). Device B 112(b) is coupled to device A 112(a) with cable 132(a), and to root device 114 with cable 132(b). Root device 114 is coupled to device C 112(c) with cable 132(c) and to device D 112(d) with cable 132(d). Device D 112(d) is coupled to device E 112(e) with cable 132(e). In the FIG. 1 embodiment, cables 132(a) through 132(e) preferably implement the 1394–1995 IEEE Standard for a High Performance Serial Bus, which is hereby incorporated by reference. However, other network connectivity standards are within the scope of the present invention.

Each device in electronic network 110 may communicate with any other device in the network. For example, device E 112(e) may communicate with device B 112(b) by transmitting data via cable 132(e) to device D 112(d), which then transmits the data via cable 132(d) to root device 114. Root device 114 then transmits the data to device B 112(b) via cable 132(b). In the FIG. 1 embodiment, root device 114 provides a master clock signal to synchronize operations for all of the devices in network 110. In other embodiments of network 110, any one of the network devices may be designated as the root device, or cycle master.

Figure 2:
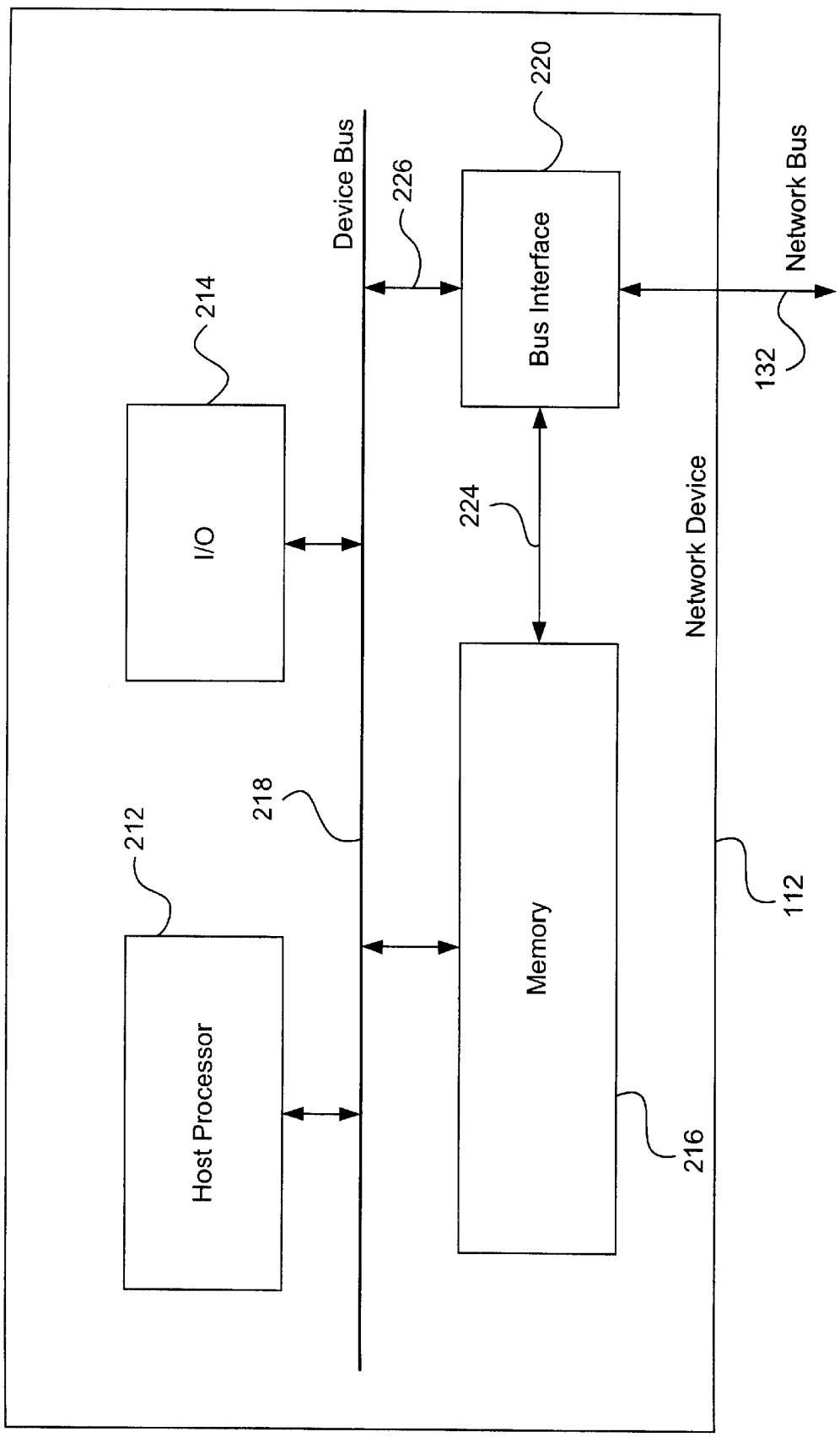
FIG. 2 is a block diagram for one embodiment of an exemplary network device from FIG. 1, according to the present invention.

Referring now to FIG. 2, a block diagram for one embodiment of an exemplary network device 112 in network 110 is shown, according to the present invention. Device 112 preferably includes, but is not limited to, a host processor 212, an input/output (I/O) interface 214, a memory 216, a device bus 218, and a bus interface 220. Host processor 212, I/O interface 214, memory 216 and bus interface 220 preferably communicate via device bus 218.

Host processor 212 may be implemented as any appropriate multipurpose microprocessor device. Memory 216 may be implemented as any combination of storage devices, including, but not limited to, read-only memory, random-access memory, and various types of non-volatile memory, such as floppy discs or hard discs. I/O interface 214 may provide an interface to a network other than network 110, for example the Internet. Bus interface 220 provides an interface between device 112 and network 110, and communicates with network 110 via cable 132. Bus interface 220 communicates with host processor 212, I/O device 214, and memory 216 via a path 226 and device bus 218. Bus interface 220 may also directly communicate with memory 216 via a path 224.

Figure 3:
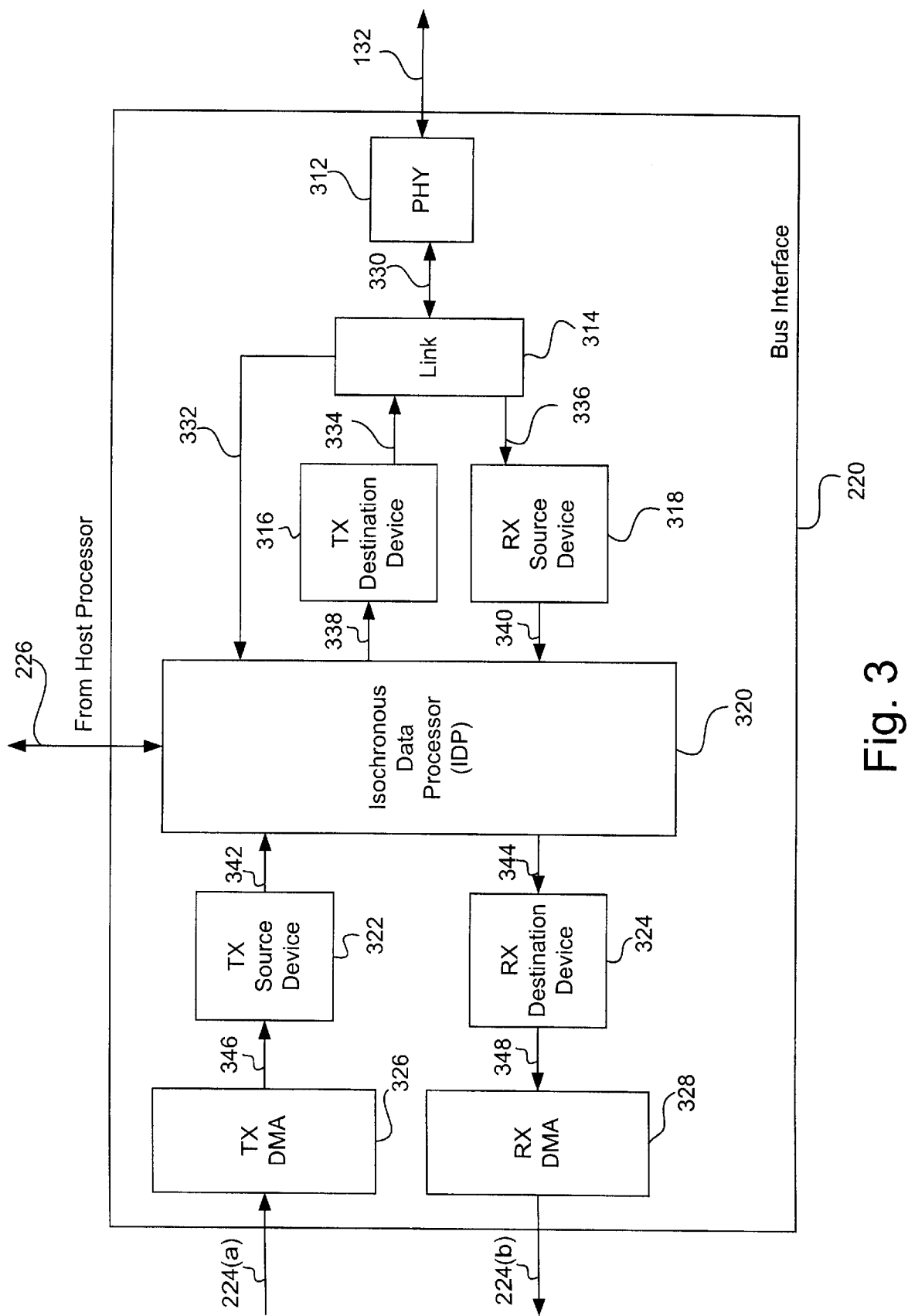
FIG. 3 is a block diagram for one embodiment of the bus interface of FIG. 2, according to the present invention.

Referring now to FIG. 3, a block diagram for one embodiment of the bus interface 220 of FIG. 2 is shown, according to the present invention. Bus interface 220 includes, but is not limited to, a physical layer (PHY) 312, a link layer (link) 314, a transmit (TX) destination device 316, a receive (RX) source device 318, an isochronous data processor (IDP) 320, a transmit (TX) source device 322, a receive (RX) destination device 324, a transmit direct-memory-access (TX DMA) 326, and a receive direct-memory-access (RX DMA) 328. Bus interface 220 typically also includes an asynchronous data processor (not shown) that manages traditional asynchronous data transfer operations. Bus interface 220 may also include additional TX source devices and additional RX destination devices. In the preferred embodiment of bus interface 220, the source devices and the destination devices are first-in-first-out (FIFO) registers.

In the FIG. 3 embodiment, when device 112 receives data on cable 132, then PHY 312 preferably transforms incoming bit stream data into bytes of data before passing the data to link 314 via path 330. Link 314 preferably decodes header information from incoming data packets and allocates the incoming data and the various pieces of header information to the appropriate destination. Header information indicates processing requirements of the corresponding data packets, and may typically include channel number, data type (for example, asynchronous or isochronous), and signal speed. Link 314 also preferably encodes header information for outgoing data packets in the format required by bus 132.

In network 110, a cycle time period preferably begins with a cycle start packet. The cycle start packet informs all of the devices on network 110 that data will be arriving on bus 132 from one or more of the devices. Link 314 allocates the cycle start packet to IDP 320 via path 332. Link 314 allocates other types of data received by device 112 to RX source device 318 via path 336. RX source device 318 preferably temporarily stores the received data before sending the data to IDP 320 via path 340. IDP 320 sends the received data to RX destination device 324 via path 344. The functionality of IDP 320 for received data is further discussed below in conjunction with FIG. 4. RX destination device 324 preferably temporarily stores the received data before sending the received data to RX DMA 328 via path 348. RX DMA 328 then preferably allocates the received data to memory 216 (FIG. 2) via path 224(b).

When device 112 transmits data on bus 132, TX DMA 326 preferably fetches the data from memory 216 via path 224(a) and sends the data to TX source device 322 via path 346. TX source device 322 preferably temporarily stores the data before sending the data to IDP 320 via path 342. The functionality of IDP 320 for transmitted data is further discussed below in conjunction with FIG. 4. IDP 320 then sends the data to TX destination device 316 via path 338. TX destination device 316 preferably temporarily stores the data before sending the data to link 314 via path 334. Link 314 next generates outgoing data packets with appropriate header information and sends the packets to PHY 312. PHY 312 then translates the bytes of the outgoing data packets into an outgoing bit stream for transmission over bus 132.

Figure 4:
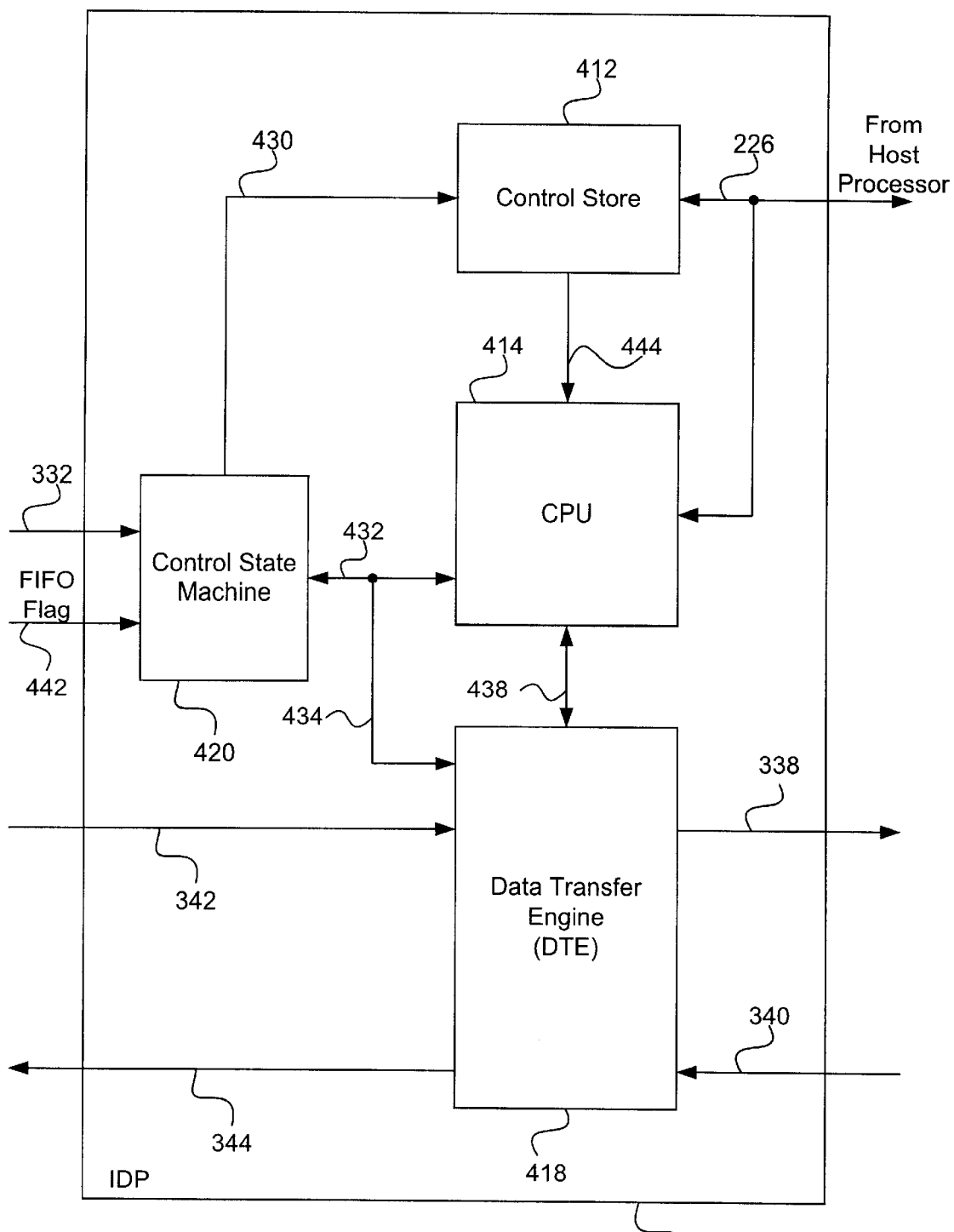
FIG. 4 is a block diagram for one embodiment of the isochronous data processor (IDP) of FIG. 3, according to the present invention.

Referring now to FIG. 4, a block diagram for one embodiment of the isochronous data processor (IDP) 320 of FIG. 3 is shown, according to the present invention. IDP 320 includes, but is not limited to, a control store 412, a central processing unit (CPU) 414, a data transfer engine (DTE) 418, and a control state machine 420.

In the FIG. 4 embodiment, control store 412 comprises a memory that preferably includes various instructions that are output via path 444 to CPU 414 for execution. The instructions are preferably loaded into control store 412 by host processor 212 (FIG. 2) via path 226. Host processor 212 also preferably loads information into a register file inside CPU 414 via path 226. Further, host processor 212 may also read back the contents of control store 412 and the register file inside CPU 414.

Control state machine 420 receives various signals from link 314 (FIG. 3) via path 332. The signals from link 314 typically include the context of data packets on bus 132, signal speed, and a channel number for received data packets. Control state machine 420 also receives a FIFO flag 442 that indicates whether TX destination device 316, RX source device 318, TX source device 322, and RX destination device 324 are full or able to receive data. Control state machine 420 also receives control signals from CPU 414 via path 432. Control state machine 420 utilizes these various signals to responsively select appropriate instructions in control store 412 for execution by CPU 414.

When device 112 is required to switch contexts, control state machine 420 selects an appropriate instruction module in control store 412 and sends a signal to DTE 418 via path 434 to activate the required state. For example, when device 112 is transmitting data over bus 132, control state machine 420 selects a transmit instruction module in control store 412 for execution by CPU 414 and activates the transmit state of DTE 418. When device 112 is receiving data from bus 132, control state machine 420 selects a receive instruction module in control store 412 for execution by CPU 414 and activates the receive state of DTE 418.

Each instruction module in control store 412 may include one or more move-multiple instructions. Move-multiple (MOVEM) instructions are used to transfer multiple words of data from a source device to a destination device. A source register and a destination register are defined in, and are a part of, each MOVEM instruction. A single MOVEM instruction may involve the transfer of a large number of words, perhaps as many as 500 words. The source register and the destination register in the MOVEM instruction determine whether the transfer is a transmit MOVEM transfer or a receive MOVEM transfer. For example, if the source register is RX source device 318 and the destination register is RX destination device 324, then the transfer is a receive MOVEM transfer. If the source register is TX source device 322 and the destination register is TX destination device 316, then the transfer is a transmit MOVEM transfer.

CPU 414 performs various operations on incoming and outgoing data according to the instructions from control store 412, and processes information in the cycle start packets provided by link 314. CPU 414 operates on incoming and outgoing data in conjunction with data transfer engine (DTE) 418. CPU 414 forwards move-multiple (MOVEM) instructions to DTE 418, which executes the MOVEM instructions to transfer multiple words of data from a source device to a destination device. DTE 418 performs the MOVEM operation while CPU 414 advantageously goes on to execute the next instruction from control store 412. The contents and functionality of DTE 418 are further described below in conjunction with FIGS. 5–8.

Figure 5:
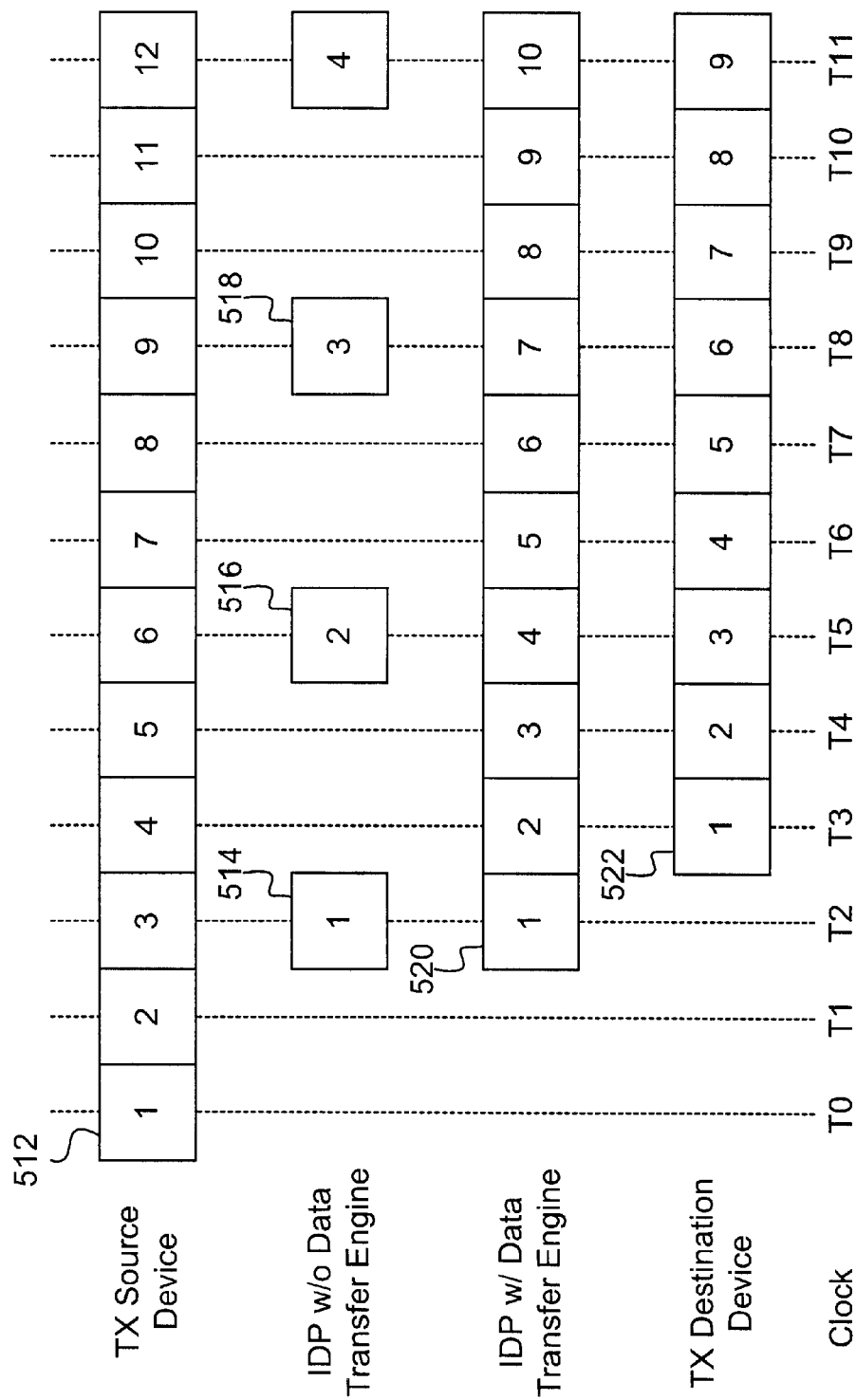
FIG. 5 is a timing diagram for an exemplary data transfer, according to one embodiment of the present invention.

Referring now to FIG. 5, a timing diagram for an exemplary data transfer is shown, according to one embodiment of the present invention. FIG. 5 shows a multiple-word transmit data transfer from TX source device 20 322 to TX destination device 316. Data, shown as data stream 512, is output from TX source device 322 at a rate of one 32-bit word per clock. The words of data from TX source device 322 are output to IDP 320 via path 342 (FIG. 3), processed by IDP 320, then output to TX destination device 316 via path 338.

In most data transfers, IDP 320 performs some type of operation on the data before outputting the data to the appropriate FIFO. In one embodiment, CPU 414 of IDP 320, without utilizing DTE 418, processes the data for three clock periods before outputting each word of data to TX destination device 316. CPU 414 alone executes the move-multiple transmit instruction to 30 move data from TX source device 322 to TX destination device 316. Thus, word 1 (514) is output from IDP 320 at clock T2. Each subsequent word is output from IDP 320 three clocks later, so that word 2 (516) is output at clock T5 and word 3 (518) is output at clock T8. This delay between words of data output from IDP 320 means that more time is required to fill TX destination device 316 with data. Since isochronous data should be delivered to bus 132 with no delay between words, TX destination device 316 should be full before outputting data to link 314 prior to delivery to bus 132. When there is delay between words of data output from IDP 320, bus interface 220 may have to wait before transmitting isochronous data.

In the preferred embodiment of the present invention, IDP 320 processes data in conjunction with DTE 418. CPU 414 sends a move multiple instruction to DTE 418, which responsively performs a data transfer process so that a word is output from IDP 320 every clock after an initial delay of three clocks. The output of IDP 320 utilizing DTE 418 is shown as data stream 520. Since data is delivered to TX destination device 316 with no delay between words, that is, at a rate of one word per clock cycle, TX destination device 316 does not have to wait more than one clock before outputting data to link 314, as shown by data stream 522.

The preferred embodiment of IDP 320 utilizing DTE 418 also performs move-multiple receive instructions with no delay between words of data. Therefore, CPU 414 in conjunction with DTE 418 advantageously transfers data from a source device to a destination device faster than processing the data transfer using CPU 414 alone.

Figure 6:
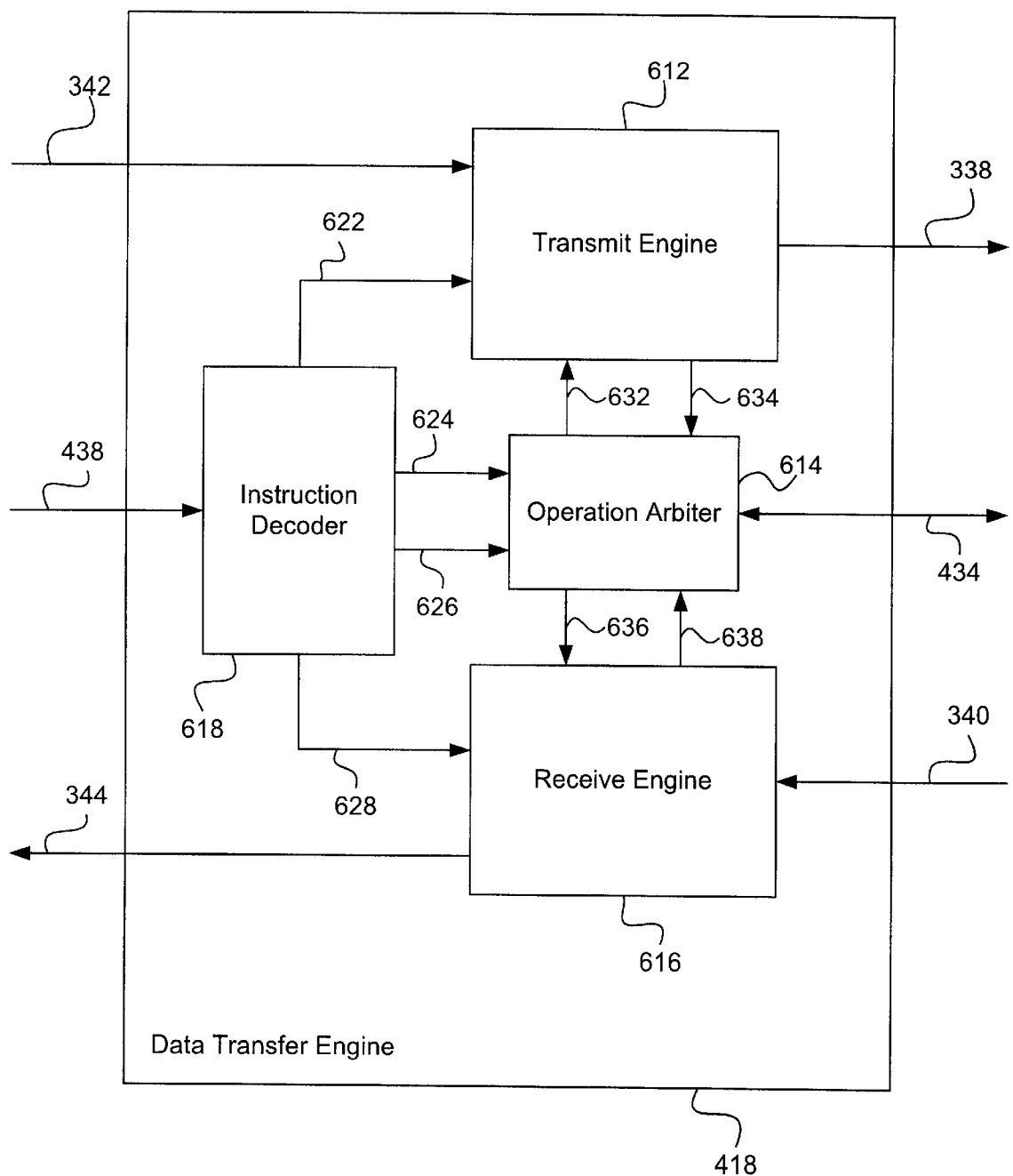
FIG. 6 is a block diagram for one embodiment of the data transfer engine of FIG. 4, according to the present invention.

Referring now to FIG. 6, a block diagram for one embodiment of data transfer engine (DTE) 418 of FIG. 4 is shown, according to the present invention. In the FIG. 6 embodiment, DTE 418 includes, but is not limited to, a transmit engine 612, an operation arbiter 614, a receive engine 616, and an instruction decoder 618. Transmit engine 612 preferably includes multiple input ports for receiving data from TX source devices 322 via path 342. Receive engine 616 preferably includes multiple output ports for sending data to RX destination devices 324 via path 344.

When CPU 414 receives a MOVEM instruction from control store 412, CPU 414 forwards the MOVEM instruction to instruction decoder 618. Instruction decoder 618 determines whether a transmit or a receive MOVEM operation should be performed according to the designated source and destination devices. If a transmit MOVEM operation should be performed, then instruction decoder 618 sends a signal to operation arbiter 614 via path 624 to activate the transmit state of operation arbiter 614. Instruction decoder 618 sends signals to transmit engine 612 via path 622 to indicate the address of the input port for the data to be transmitted, the number of words of data to be transmitted, and that the data is to be sent to a transmit data output port. If a receive MOVEM operation should be performed, instruction decoder 618 sends a signal to operation arbiter 614 via path 626 to activate the receive state of operation arbiter 614. Instruction decoder 618 sends signals to receive engine 616 via path 628 to indicate the address of the output port for the data to be received, the number of words of data to be received, and that the data is to be received from a receive data input port.

Operation arbiter 614 is preferably a state machine that controls the operation of transmit engine 612 and receive engine 616. When operation arbiter 614 receives a signal from instruction decoder 618 to activate the transmit state, operation arbiter 614 responsively sends a transmit active signal to transmit engine 612 via path 632. When transmit engine 612 has completed the transmit operation, transmit engine 612 sends a transmit end signal to operation arbiter 614 via path 634. The contents and functionality of transmit engine 612 are further described below in conjunction with FIG. 7.

When operation arbiter 614 receives a signal from instruction decoder 618 to activate the receive state, operation arbiter 614 responsively sends a receive active signal to receive engine 616 via path 636. When receive engine 616 has completed the receive operation, receive engine 616 sends a receive end signal to operation arbiter 614 via path 638. The contents and functionality of receive engine 616 is further discussed below in conjunction with FIG. 8.

Operation arbiter 614 may also receive a signal from control state machine 420 via path 434. This signal indicates that a context switch is required, and operation arbiter 614 responsively sends an active signal to the appropriate engine.

Transmit engine 612 and receive engine 616 operate independently so that both a transmit MOVEM operation and a receive MOVEM operation may be performed at the same time, while CPU 414 is executing further instructions. This ability to perform more than one operation simultaneously allows IDP 320 to advantageously perform data transfers quickly and efficiently.

Figure 7:
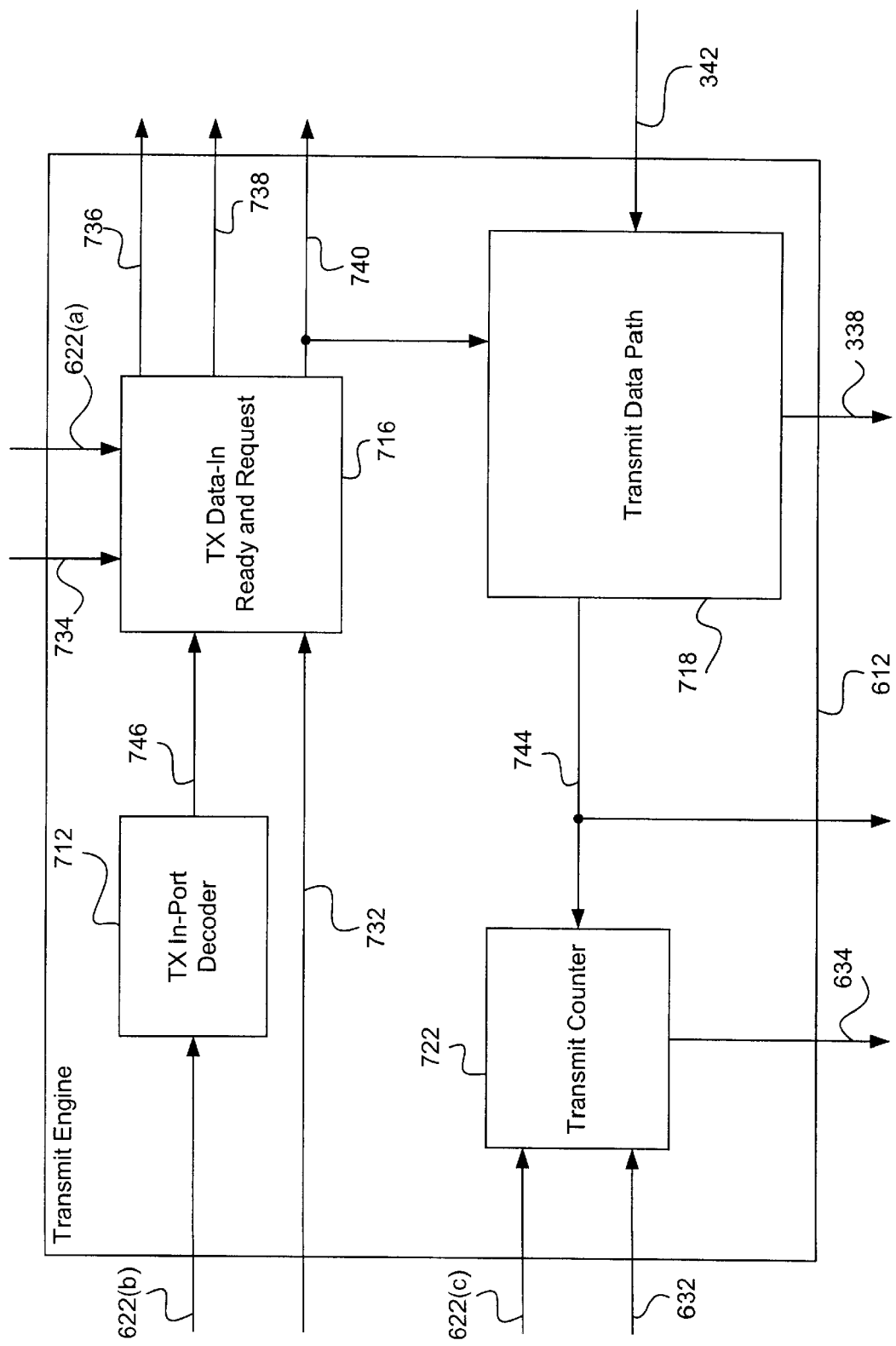
FIG. 7 is a block diagram for one embodiment of the transmit engine of FIG. 6, according to the present invention.

Referring now to FIG. 7, a block diagram for one embodiment of transmit engine 612 of FIG. 6 is shown, according to the present invention. Transmit engine 612 includes, but is not limited to, a transmit (TX) in-port decoder 712, a transmit (TX) data-in ready and request 716, a transmit data path 718, and a transmit counter 722. TX in-port decoder 712 receives an address of the input port for data to be transmitted from instruction decoder 618 via path 622(b). Transmit counter 722 receives a data count, which is the number of words to be transmitted, from instruction decoder 618 via path 622(c). Transmit counter 722 also receives a transmit active signal from operation arbiter 614 via path 632, and an availability signal to indicate that the transmit data output port has data available from transmit data path 718 via path 744. The availability signal indicating available data on the transmit data output port is used to decrement the data count in transmit counter 722, and is also sent to link 314 via path 744. When transmit counter 722 has counted the appropriate number of words, which indicates that a particular transmit operation is complete, transmit counter 722 sends a transmit end signal to operation arbiter 614 via path 634.

TX data-in ready and request 716 receives a ready signal from the source device, typically TX source device 322, via path 734, which indicates that data in the source device is ready to be transferred. TX data-in ready and request 716 responsively sends a request signal to the source device via path 740 to request that data be output from the source device to transmit data path 718 via path 342. TX data-in ready and request 716 also sends this request signal to transmit data path 718 to indicate that data is being requested from the source device.

TX data-in ready and request 716 receives a status signal from the destination device, typically TX destination device 316, via path 732, which indicates whether the destination device is full or able to accept data. If the destination device is full, TX data-in ready and request 716 will not request data from the source device as described above. TX data-in ready and request 716 also communicates with control state machine 420 regarding the status of the transmit input ports, sending an active signal indicating that one of the transmit input ports is active via path 736, and also sending an inactive signal that all of the transmit input ports are inactive via path 738.

Figure 8:
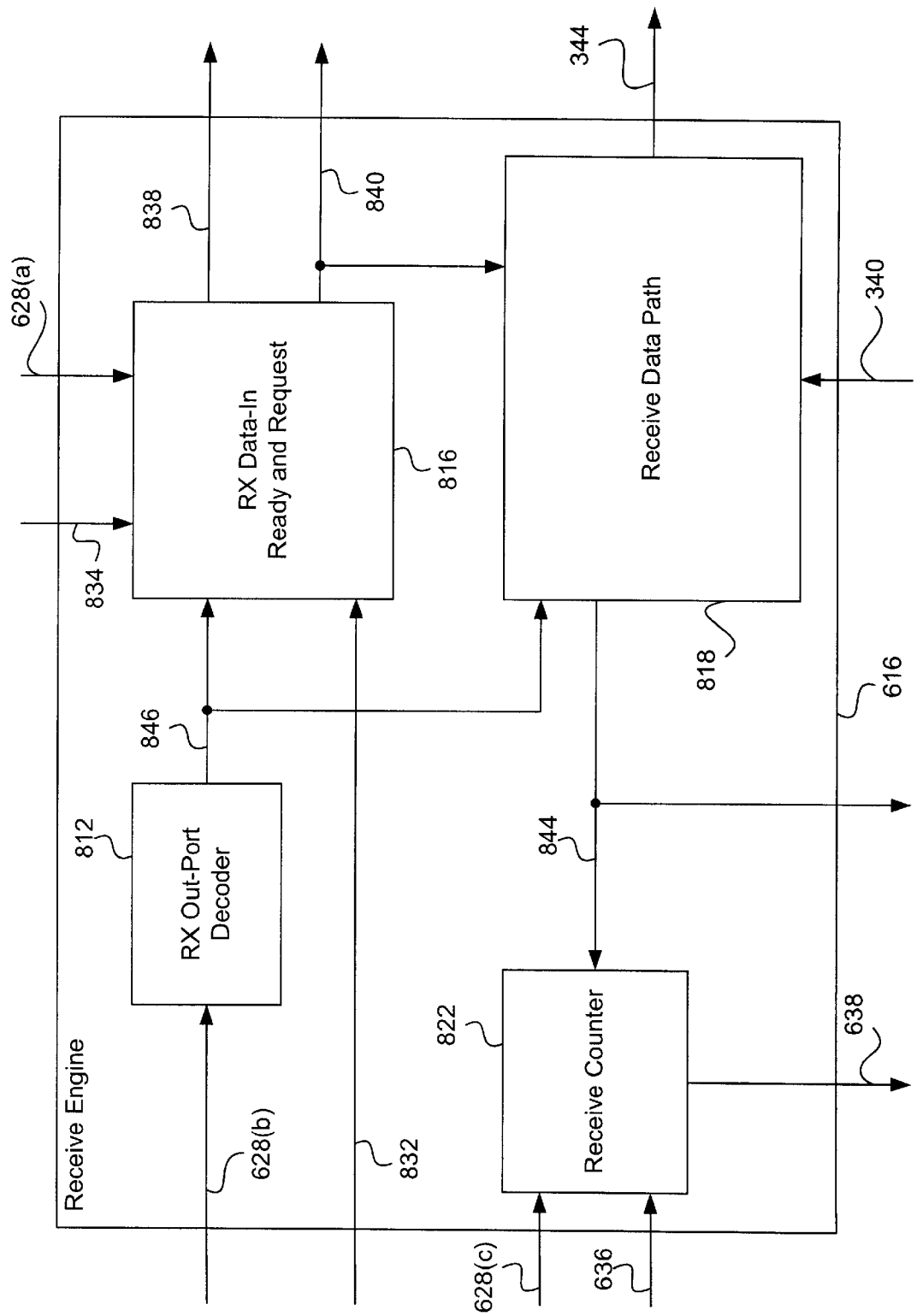
FIG. 8 is a block diagram for one embodiment of the receive engine of FIG. 6, according to the present invention.

Referring now to FIG. 8, a block diagram for one embodiment of receive engine 616 of FIG. 6 is shown, according to the present invention. In the FIG. 8 embodiment, receive engine 616 includes, but is not limited to, a receive (RX) out-port decoder 812, a receive (RX) data-in ready and request 816, a receive data path 818, and a receive counter 822. Instruction decoder 618 sends an address of the output port for data to be received to RX outport decoder 812 via path 628(b). RX out-port decoder 812 responsively sends a signal to RX data-in ready and request 816 and also to receive data path 818 via path 846 to indicate that the data transfer is a receive operation and to indicate which receive output port is to receive the data.

Instruction decoder 618 sends a data count, which is the number of words to be received, to receive counter 822 via path 628(c). Receive counter 822 also receives a receive active signal from operation arbiter 614 via path 636, and an availability signal from receive data path 818 via path 844 to indicate that one of the receive output ports has data available. The availability signal indicating that one of the receive output ports has data available is used to decrement the data count in receive counter 822, and is also sent to RX destination devices 324 via path 844. When receive counter 822 has counted the appropriate number of words, which indicates that a particular receive operation is complete, receive counter 822 then sends a receive end signal to operation arbiter 614 via path 638.

RX data-in ready and request 816 receives a ready signal from a source device, typically RX source device 318, via path 834, which indicates that data in the source device is ready to be received. RX data-in ready and request 816 responsively sends a request signal to the source device via path 840 to request that data be output from the source device to receive data path 818 via path 340. RX data-in ready and request 816 also sends this request signal via path 840 to receive data path 818 to indicate that data is being requested from the source device.

RX data-in ready and request 816 receives a status signal from the destination device, typically RX destination device 324, via path 832, to indicate whether the destination device is full or able to accept data. If the destination device is full, RX data-in ready and request 816 will not request data from the source device as described above. RX data-in ready and request 816 sends a not-ready signal to control state machine 420 via path 838 to indicate that data in RX source device 318 is not ready.

Figure 9:
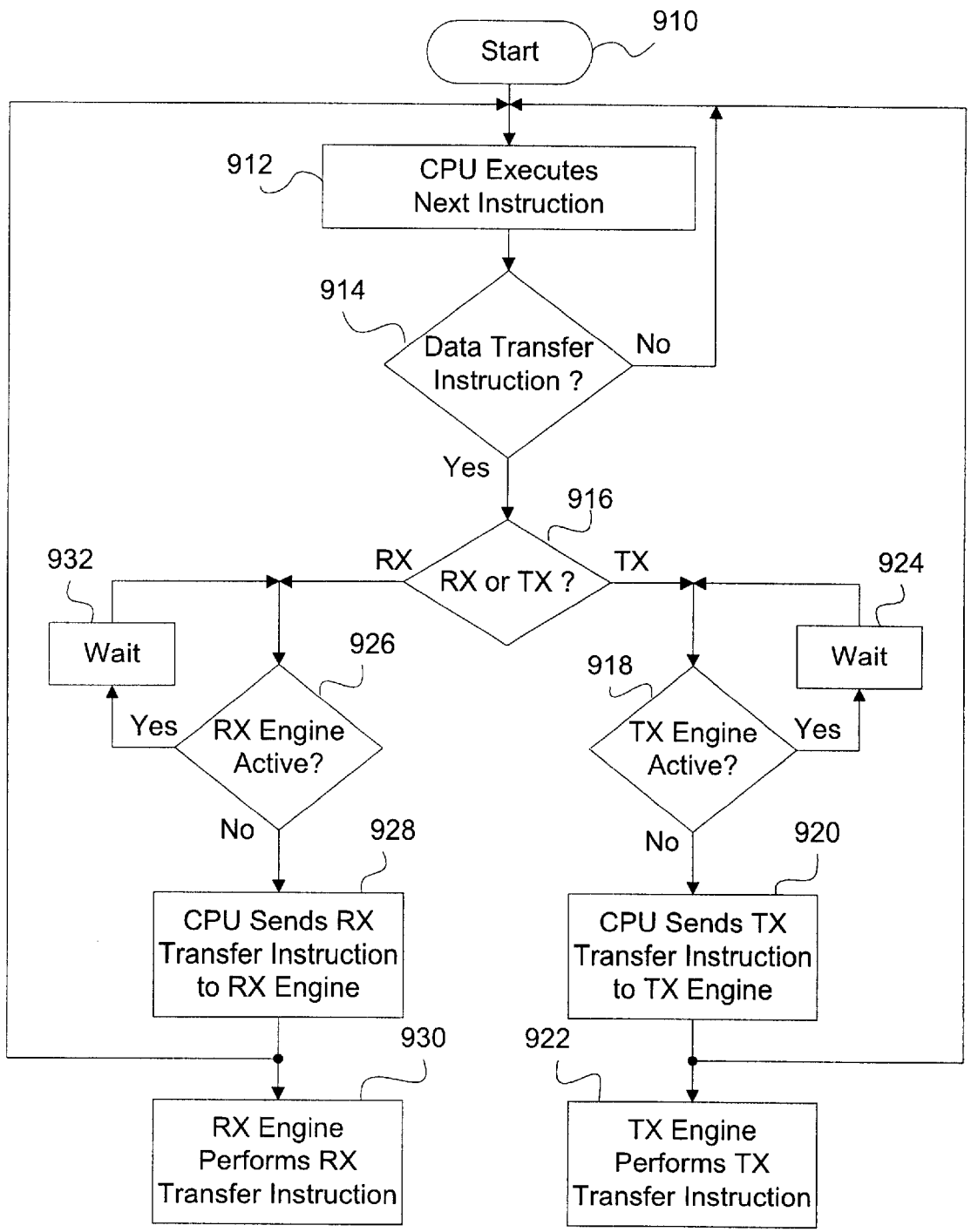
FIG. 9 is a flowchart of method steps for fast data transfers in an electronic network, according to one embodiment of the present invention.

Referring now to FIG. 9, a flowchart of method steps for an exemplary fast data transfer in an electronic network is shown, according to one embodiment of the present invention. Initially, in step 912, CPU 414 executes an instruction from control store 412. Then, in step 914, control state machine 420 determines whether a next instruction is a data transfer instruction. If the next instruction is not a data transfer instruction, then the FIG. 9 method returns to step 912, where CPU 414 executes the next instruction.

However, if the next instruction is a data transfer instruction, then, in step 916, control state machine 420 determines whether the data transfer instruction is a receive or transmit transfer instruction. If the data transfer instruction is a transmit transfer instruction, then, in step 918, control state machine 420 determines whether transmit engine 612 is active. If transmit engine 612 is active, then, in step 924, CPU 414 waits until transmit engine 612 is no longer active. However, if transmit engine 612 is not active, then in step 920, CPU 414 sends the transmit transfer instruction to transmit engine 612. Next, in step 922, transmit engine 612 performs the transmit transfer instruction, while at the same time, the FIG. 9 method returns to step 912, where CPU 414 executes a next instruction. Thus CPU 414 and transmit engine 612 may advantageously be active at the same time.

In step 916, if the data transfer instruction is a receive transfer instruction, then, in step 926, control state machine 420 determines whether receive engine 616 is active. If receive engine 616 is active, then, in step 932, CPU 414 waits until receive engine 616 is no longer active. However, if receive engine 616 is not active, then, in step 928, CPU 414 sends the receive transfer instruction to receive engine 616. Next, in step 930, receive engine 616 performs the receive transfer instruction, while at the same time the FIG. 9 method returns to step 912, where CPU 414 executes a next instruction. Thus CPU 414 and receive engine 616 may advantageously be active at the same time. Further, DTE 418 may perform both transmit and receive data transfers while CPU 414 proceeds to execute next instructions, so that IDP 320 performs data transfers in a rapid and efficient manner, in accordance with the present invention.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for performing data transfers, comprising:
a data transfer engine configured to independently execute data transfer instructions, said data transfer engine including a transmit engine and a receive engine that each operate independently, said data transfer engine further including an instruction decoder that receives said data transfer instructions from said processor, said instruction decoder forwarding transmit transfer instructions to said transmit engine and forwarding receive transfer instructions to said receive engine, said instruction decoder identifying said transmit transfer instructions and said receive transfer instructions according to designations of a source register and a destination register in said data transfer instructions; and a processor coupled to said data transfer engine, said processor being configured to forward said data transfer instructions to said data transfer engine.

2. The system of claim 1, wherein said system is implemented in an interface between a host device and an electronic network.

3. The system of claim 2, wherein said system is implemented in an isochronous data processor in said interface.

4. The system of claim 2, wherein said electronic network includes a serial bus network implementing an IEEE 1394 serial bus interconnectivity standard.

5. The system of claim 2, wherein said host device is a consumer electronic device.

6. The system of claim 5, wherein said consumer electronic device is a digital video and audio recording and playback device.

7. The system of claim 1 further comprising a memory coupled to said processor, said memory being configured to store instructions including said data transfer instructions.

8. The system of claim 1, wherein said data transfer instructions are move-multiple instructions for transferring multiple data words from a source device to a destination device.

9. The system of claim 1, wherein said data transfer engine transfers data words from a source device to a destination device with minimal delay between adjacent ones of said data words.

10. The system of claim 9, wherein said data transfer engine delivers said data words to said destination device at a rate of one word per clock cycle of said system.

11. The system of claim 9, wherein said data words include isochronous data.

12. The system of claim 1, wherein said transmit engine performs a transmit transfer operation and said receive engine concurrently performs a receive transfer operation.

13. The system of claim 1, wherein said transmit engine transfers data words from a source device to a destination device with minimal delay between adjacent ones of said data words.

14. The system of claim 1, wherein said receive engine transfers data words from a source device to a destination device with minimal delay between adjacent ones of said data words.

15. The system of claim 1, wherein said data transfer engine further includes an operation arbiter coupled to said transmit engine and said receive engine, said operation arbiter being a state machine configured to control said transmit engine and said receive engine.

16. The system of claim 1, wherein said transmit engine includes a transmit in-port decoder, a transmit data-in ready and request, a transmit counter, and a transmit data path.

17. The system of claim 1, wherein said receive engine includes a receive out-port decoder, a receive data-in ready and request, a receive counter, and a receive data path.

18. A system for performing data transfers comprising:
a data transfer engine configured to independently execute data transfer instructions, said data transfer engine including a transmit engine and a receive engine that each operate independently, said data transfer engine further including an instruction decoder that receives said data transfer instructions from said processor, said instruction decoder forwarding transmit transfer instructions to said transmit engine and forwarding receive transfer instructions to said receive engine, said instruction decoder identifying said transmit transfer instructions and said receive transfer instructions according to designations of a source register and a destination register in said data transfer instructions; and a processor coupled to said data transfer engine, said processor being configured to forward said data transfer instructions to said data transfer engine.

19. A method for performing data transfers, comprising the steps of:

forwarding data transfer instructions from a processor to a data transfer engine, said data transfer engine including a transmit engine and a receive engine that each operate independently, said data transfer engine further including an instruction decoder that receives said data transfer instructions from said processor, said instruction decoder forwarding transmit transfer instructions to said transmit engine and forwarding receive transfer instructions to said receive engine, said instruction decoder identifying said transmit transfer instructions and said receive transfer instructions according to designations of a source register and a destination register in said data transfer instructions; and executing said data transfer instructions independently using said data transfer engine.

20. The method of claim 19, wherein said processor and said data transfer engine are implemented in an interface between a host device and an electronic network.

21. The method of claim 20, wherein said processor and said data transfer engine are implemented in an isochronous data processor in said interface.

22. The method of claim 20, wherein said electronic network includes a serial bus network implementing an IEEE 1394 serial bus interconnectivity standard.

23. The method of claim 20, wherein said host device is a consumer electronic device.

24. The method of claim 23, wherein said consumer electronic device is a digital video and audio recording and playback device.

25. The method of claim 19, further comprising the step of storing instructions including said data transfer instructions in a memory coupled to said processor.

26. The method of claim 19, wherein said data transfer instructions are move-multiple instructions for transferring multiple data words from a source device to a destination device.

27. The method of claim 19, wherein said data transfer engine transfers data words from a source device to a destination device with minimal delay between adjacent ones of said data words.

28. The method of claim 27, wherein said data transfer engine delivers said data words to said destination device at a rate of one word per clock cycle of said system.

29. The method of claim 27, wherein said data words include isochronous data.

30. The method of claim 19, wherein said transmit engine performs a transmit transfer operation and said receive engine concurrently performs a receive transfer operation.

31. The method of claim 19, wherein said transmit engine transfers data words from a source device to a destination device with minimal delay between adjacent ones of said data words.

32. The method of claim 19, wherein said receive engine transfers data words from a source device to a destination device with minimal delay between adjacent ones of said data words.

33. The method of claim 19, wherein said data transfer engine further includes an operation arbiter coupled to said transmit engine and said receive engine, said operation arbiter being a state machine configured to control said transmit engine and said receive engine.

34. The method of claim 19, wherein said transmit engine includes a transmit in-port decoder, a transmit data-in ready and request, a transmit counter, and a transmit data path.

35. The method of claim 19, wherein said receive engine includes a receive out-port decoder, a receive data-in ready and request, a receive counter, and a receive data path.

36. A method for performing data transfers comprising the steps of:

forwarding data transfer instructions from a processor to a data transfer engine, said data transfer engine including a transmit engine and a receive engine that each operate independently, said data transfer engine further including an instruction decoder that receives said data transfer instructions from said processor, said instruction decoder forwarding transmit transfer instructions to said transmit engine and forwarding receive transfer instructions to said receive engine, said instruction decoder identifying said transmit transfer instructions and said receive transfer instructions according to designations of a source register and a destination register in said data transfer instructions; and executing said data transfer instructions independently using said data transfer engine.

* * * * *